Dec. 9, 1969 KATSUYUKI IWAI ET AL 3,483,318

SYSTEM AND METHOD FOR DIRECT MAGNETIC RECORDING AND REPRODUCING OF TELEVISION SIGNALS EMPLOYING INVERSION OF SYNC PULSES

Filed Aug. 15, 1966 4 Sheets-Sheet 1

Dec. 9, 1969 KATSUYUKI IWAI ET AL 3,483,318

SYSTEM AND METHOD FOR DIRECT MAGNETIC RECORDING AND REPRODUCING OF TELEVISION SIGNALS EMPLOYING INVERSION OF SYNC PULSES

Filed Aug. 15, 1966 4 Sheets-Sheet 4

United States Patent Office 3,483,318 Patented Dec. 9, 1969

3,483,318

SYSTEM AND METHOD FOR DIRECT MAGNETIC RECORDING AND REPRODUCING OF TELEVISION SIGNALS EMPLOYING INVERSION OF SYNC PULSES

Katsuyuki Iwai, Motonori Fukatsu, and Fujio Sato, Tokyo, Japan, assignors to Akai Electric Company Limited, Tokyo, Japan, a corporation of Japan Filed Aug. 15, 1966, Ser. No. 572,284
Claims priority, application Japan, Feb. 8, 1966, 41/7,254
Int. Cl. H04n 5/78
U.S. Cl. 178—6.6 7 Claims

ABSTRACT OF THE DISCLOSURE

A magnetic recording and reproducing system for directly recording television signals on magnetic tape is disclosed. Prior to recording, the negatively polarized synchronizing pulses of the television signal are inverted to be positively polarized and having peak values greater than the "white" level of the video portion of the television signal. This reduces the variation of the A.C. component of the composition signal thereby reducing distortion of the recorded signal. Upon being reproduced, the positively polarized synchronizing pulses are separated and processed to reproduce the original negatively polarized pulses which are then combined with the reproduced video signal for display by a television receiver.

BACKGROUND OF THE INVENTION

Field of the invention

This invention relates to improvements in and relating to magnetic recording and reproducing techniques relying upon the direct system, and preferably with use of stationary magnetic heads. The direct system as mentioned throughout the specification is meant by such technique that the television signals to be magnetically recorded are procesed directly or more specifically without use of frequency modulation, and the recorded television signals are also processed directly in the course of the magnetically reproducing step, or without use of frequency demodulation.

Description of the prior art

It has been observed that when viewing the television picture scenes once recorded and reproduced in the direct way as above mentioned and according to the conventional technique, considerable amount of white-and-black noise strips frickeringly appear on the screen.

According to our experiments as will be later set forth herein, this kind of disturbing and irritating generation of noise strips are cause substantially by clamp noises in the course of direct reproducing of the direct recorded television signal.

SUMMARY OF THE INVENTION

It is therefore the main object of the present invention to provide an improved and efficient magnetic recording and reproducing system capable of obviating substantially the aforementioned drawbacks inherent in the conventional comparative technique, and of providing clear and sharp reproduced television images based upon a considerably improved signal to noise ratio.

Another object of the present invention is to provide a magnetic recording and reproducing system for television signals, capable of treating biasing current without adversely affecting the synchronizing signals.

Still another object of the present invention to provide a magnetic recording and reproducing system for television signals, capable of separating sync signals from the television signal in the course of the magnetic processing of the latter.

For the realization of the aforementioned object, the system according to the present invention is characterized in that the television signal is processed in advance of the magnetic record in such a way that negatively polarized synchronizing pulses contained therein are processed to have a positively polarized form having peak values arranged in a straight line selected at a signal level higher than the "white" level of video signals contained in the television signal.

The reproducing stage for the recorded signal according to the present invention separates the synchronizing pulses from the modifiedly recorded and then picked-up television signal, subjects the separated pulses to amplifying, and phase conversion, and finally combines the thus processed synchronizing pulses with the pick-up television signal in phase with the positively polarized synchronizing pulses.

BRIEF DESCRIPTION OF THE DRAWINGS

Other objects, features and advantages of the invention will become apparent from the detailed description when read with the accompanying drawings.

In the drawings:

FIG. 6(*b*) is a similar view to FIG. 6(*a*), wherein however 40%-positively polarized synchronizing pulses have been employed as a comparative and intermediate proposal between the conventional technique and the inventive measure.

FIG. 6(*c*) is a similar view to FIGS. 6(*a*) and 6(*b*), wherein however 140%-positively polarized synchronizing pulses have been employed as a representative, yet in no limiting sense, of the inventive technique.

FIG. 7(*b*) shows a diagram of signal level against frequency of signal, the model shape of which is shown in FIG. 7(*a*), illustrating the comparative results of variout pseudo-television signals including synchronizing pulses polarized from −100% to +150%.

DETAILED DESCRIPTION OF THE INVENTION

In advance of entering into the detailed description of the invention, a brief and preparatory explanation will be given to demonstrate the nature of and inherent drawbacks in the comparative conventional technique, as well as the basic principles of the invention, with reference to FIGS. 1–7.

Figure 1:
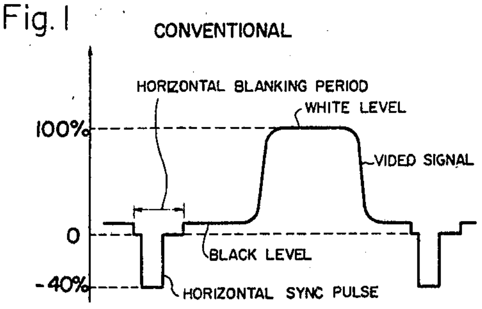
FIG. 1 is a diagrammatic representation of a part of the regular television signal extending over substantially a horizontal scanning period.

In FIG. 1, there is illustrated a part of the conventional television signal extending substantially over a horizontal scanning period.

As seen from FIG. 1 and as commonly known, the television signal now broadly used in the art generally comprises video signals, synchronizing signals, hereinafter called briefly as sync signals or pulses, and blanking signals. Wren taking the signal level during the blanking period at zero, the maximum possible level of video signals, or "white" level, is selected to denote +100%, while the peak of the sync pulses is selected to −40%, which will be denoted hereinafter as "40%-negatively polarized sync pulses."

Figure 2:
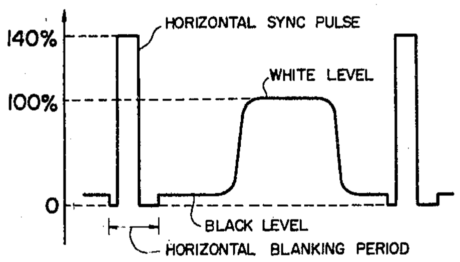
FIG. 2 is a similar view to FIG. 1, illustrating a modified television signal according to this invention.

In comparison with this kind of negatively polarized sync pulses, and for various technical reasons as will be set forth hereinafter, the sync pulses are modified according to this invention so as to represent considerably and positively polarized pulses as shown in FIG. 2, only by way of example. In the preferred embodiment, the degree of positive polarization of sync pulses amounts to as high as +140% as shown.

In the conventional direct magnetic recording technique of television signals, these have been recorded as per se, or more specifically while keeping in their original shape so as to reserve the negative polarity of the contained sync pulses.

Figure 3:
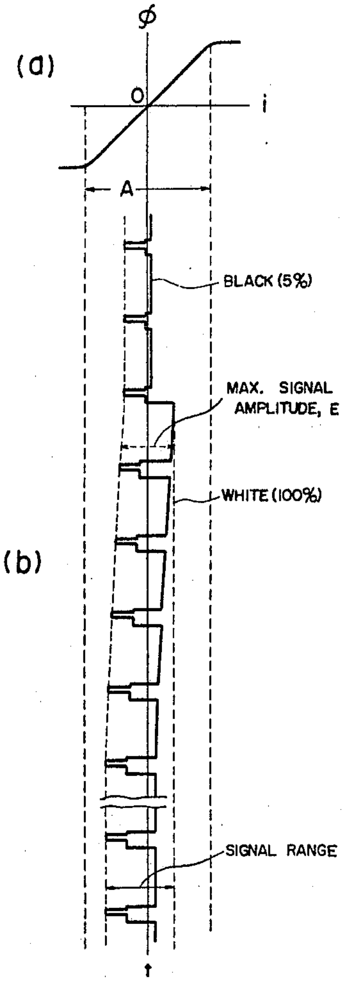
FIG. 3 is a characteristic curve only schematically shown, illustrating the relationship between residual magnetism and impressed magnetic field on the magnetic medium of a magnetic tape in the course of magnetic recording of a television signal when relying upon the biasing technique.

On the other hand, the residual magnetic characteristic of magnetic material of recording medium such as magnetic tape when employing the conventional high frequency biasing technique may be expressed schematically as that shown in FIG. 3 at (*a*). The linear range of this characteristic curve is denoted therein by A. The corresponding maximum possible record current is limited not only by the degree of bias and the kind and nature of the magnetic material on the tape, but also by such operating conditions that, since a D.C. blocking condenser is inserted between the record amplifier and the magnetic record head, the working range of the input signal to the head may exceed the maximum amplitude of the signal which means that the recordable level of the signal will be correspondingly reduced as will be seen at FIG. 3 at (*b*). It will be further noted that when reproduced, the signal to noise ratio of the signal will become correspondingly worse.

Figure 4:
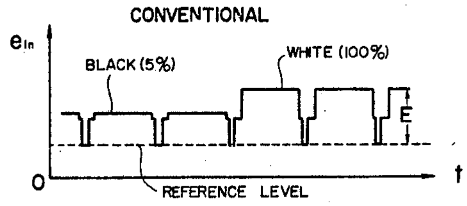
FIG. 4 is a diagram showing the wave form of a television signal when recorded, reproduced and D.C. restored according to the conventional technique.

FIG. 4 shows the wave form of a directly recorded, directly reproduced and then D.C.-restored television signal, wherein the reference level of the latter is constant relative to the progress of time and thus the peaks of the sync pulse series are in line one after another. In this case, the range of signal voltage variation is of a constant value which is expressed in FIG. 4 by E (volts).

Figure 5:
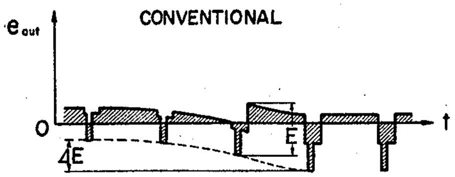
FIG. 5 is a similar view to FIG. 4, wherein however D.C. components have been interrupted.

When this kind of television signal is passed through a condenser the output voltage, $e_{out}$, therefrom will take the form shown in FIG. 5 as an example. In this case, the voltage range will be E (volts), the meaning of which is same as before, plus ΔE (volts), the latter corresponding to the "sag" or low frequency signal distortion which has been introduced by the interruption of the D.C. component. Since it is a common practice to provide a condenser between the final stage or record amplifier and the record head, when an amplified television signal is fed from the amplifier to the head, a similar phenomenon as that described above with reference to FIG. 5 will naturally take place. This means that a certain value of record level range A (see FIG. 3 at (*a*) is reduced in its effect by the aforementioned sag, ΔE, the value of the latter depending upon the contents of the television signal to be processed.

Figure 6A:
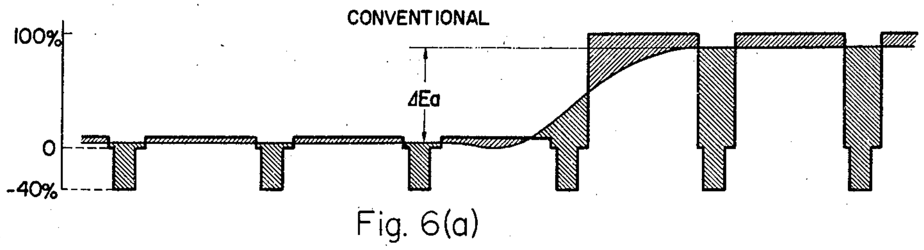
FIG. 6(*a*) is the wave form of a conventional television signal containing 40% negatively polarized synchronizing pulses.
Figure 6B:
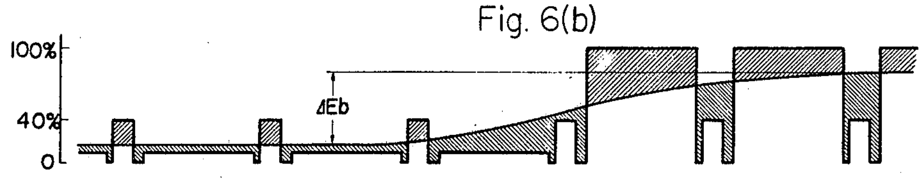
Figure 6C:
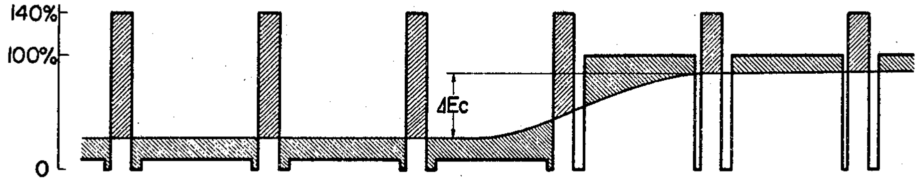

In FIG. 6 at (*a*), there is shown a conventional television signal with 40%-negatively polarized sync pulses, as magnetically recorded and reproduced in a direct manner and processed through a D.C.-restoration step. The left-hand side of this television signal corresponds to that having video signals which represent the "black" level, while the right-hand side of the television signal comprises video signals amounting to their maximum possible positive level or more specifically the "white" level, Δ*Ea* denoting the variation in the value of the alternating current axis as observed in these two cases of extreme values of video signal. The alternating current axis stands herein for an axis representing the mean value of voltage variation of signal.

In FIG. 6 at (*b*), a similar view is shown, wherein however sync pulses are selected to have a 40%-positively polarized value. In this case, Δ*Eb* denotes equally the variation of the alternating current axis.

FIG. 6 at (*c*) is a similar view to those shown at (*a*) and (*b*) in the same figure, wherein however the sync pulses are selected to have as high as 140%-positively polarized value. In this case, Δ*Ec* denotes the aforementioned kind of voltage variation.

It could be clearly observed from these comparative graphs that the values of Δ*Eb* and Δ*Ec* are considerably smaller than the value of Δ*Ea*.

The variation of the alternating current axis relative to a certain predetermined allowable range for magnetic recording should be selected to be as small as possible, as was referred to hereinbefore, for the purpose of making the recordable range of video signals and at the same time for improving the signal to noise ratio of the recorded and reproduced video signals. It can be therefore concluded that with use of the modified television signal having positively polarized sync pulses, considerably improved and efficient results are realized in the process for magnetically recording and reproducing television signals in a direct manner, in comparison with the case wherein regular and conventional television signals with negatively polarized sync pulses are processed.

When considering the case wherein the modified television signal with sync pulses 40%-positively polarized as shown in FIG. 6 at (*b*) is intended to be recorded and reproduced, it will be easily understood that difficulties may arise in the separation of sync pulses in the reproducing stage, when relying upon regular and conventional sync pulse separators since the white level of video signal is at 100% in comparison with the peak of the now modified sync pulse being plus 40%.

As supported from the fact that the regular television signal with 40%-negatively polarized sync pulses can be easily treated by a conventional sync separator for the separation of sync pulses from the video signal contained in the television signal, the secondly modified television signal with 140%-positively polarized sync pulses as shown in FIG. 6 at (*c*), being 40% higher from the 100% or white level of the video signal, can be easily processed in the conventional sync separators for the separation of the sync pulses.

In order to minimize as much as possible the variation in the position of the aforementioned axis of the alternating current component of the video signal upon being processed, it is desirable to modify the signal so as to select the peak of the contained positively polarized sync pulses at a maximum possible highest value. On the other hand, if the peak level of the positively polarized sync pulses be selected at a too high value, the relative level of the video signals would become low and the signal to noise ratio would become correspondingly worse. Therefore, an optimum compromise must be made between the two opposing factors.

Figure 7B:
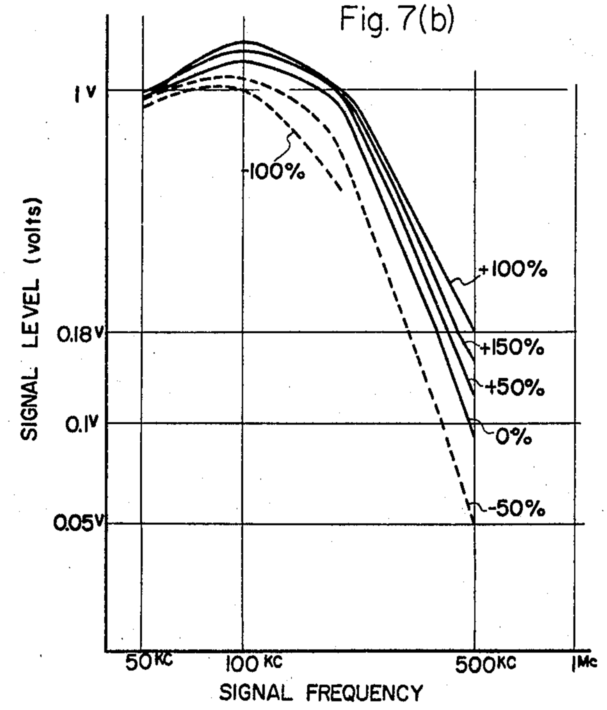
FIG. 7(*a*) is a diagram of a model signal employed in several experiments carried out for finding out the basic principles of the inventive technique.
Figure 7A:
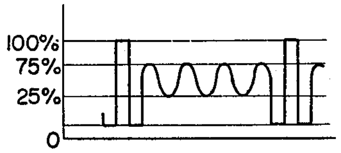

For finding a reliable measure, several experiments have been carried out with use of a pseudo-television signal having the shape as illustrated in FIG. 7 at (*a*). In this case, zero level corresponds to the "black" level in the regular television signal and a sine wave ranging from 25–75% is adopted so as to represent a video signal in a simplified manner, while as the peak level of the sync pulses +150%, +100%, +50%, 0%, −50% and −100% are adopted respectively. The frequency of the sinusoidal signal was varied from 50 to 500 kc./s. This composite signal was recorded and reproduced in a direct manner with use of stationary magnetic heads each having a slit gap of 1 micron cooperating with a standard magnetic tape ¼ inch width which comprises a plastic base 25 microns thick and magnetic layer 5 microns thick, and kept running at a speed of 60 inches per second. In the course of the recording, the high frequency bias was impressed according to the conventional cross-field technique. The resulting voltage levels of the reproduced sinusoidal signal are plotted in FIG. 7 at (*b*) against the frequency thereof. As seen, the results were most favorable when the sync pulses were set at their peak value to +100% voltage level. This is a reliable demonstration when in the foregoing embodiment the peak of sync pulses is set to +140%, the variation in the value of the A.C. axis $\Delta E$ is considerably smaller than in the case wherein the peak is as conventionally set to −40%, thereby resulting in an increased voltage level of the recorded and reproduced video signals and improved signal to noise ratio.

Figure 9A:
FIGURES 9(*a*), 9(*b*) and 9(*c*) are diagrams illustrative of wave forms of several signals appearing at preferred points in the circuit shown in FIG. 8.
Figure 9B:
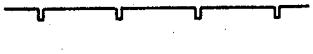
Figure 9C:

Next, referring to FIGS. 8 and 9, a preferred embodiment of a recording system for carrying out the aforementioned novel teaching will be described hereinbelow in detail:

Now assume that a television signal shown schematically in FIG. 9 at (*a*) is applied to input terminal 11 and then conveyed through a junction point 12 partially to sync pulse separator 13 and adder circuit 14, respectively. In the former case, the signal is fed through a coupling condenser $C_1$ to the base electrode of transistor $Tr_1$. The signal from the emitter electrode of said transistor is passed through a time constant circuit comprising condenser $C_2$ and resistor $R_1$ which is provided to avoid pulse noise interference to the sync pulse separating operation performed by transistor $Tr_2$, as is well known to those skilled in the art, thence through coupling condenser $C_3$ to the base electrode of transistor $Tr_2$. The value of resistor $R_2$ and $R_{20}$ are beforehand properly adjusted so as to suppress the video signal and to take out only the sync pulses from the collector electrode of said last transistor. The thus separated sync pulses are then conveyed through a further time constant circuit comprising condenser $C_4$ and resistor $R_3$, thence through coupling condenser $C_5$ to the base electrode of transistor $Tr_3$ acting as an amplifier. The above mentioned time constant circuit and the amplifier $Tr_3$ comprise a conventional transistorized pulse amplifier, and the condenser $C_4$ is a so-called "speed up" condenser. The amplified signal is taken out from the collector electrode of the transistor $Tr_3$ and directly applied on the base electrode of buffer transistor $Tr_4$, the output therefrom is taken out through the intermediary of the slider of rheostat $R_4$. The thus separated and processed sync pulses of the waveform shown in FIG. 9 at (*b*) are then fed through a connecting lead 100 to adder circuit 14.

On the other hand, the input television signal is fed through junction point 12, variable resistor $R_5$ and coupling condenser $C_6$ to the transistor $Tr_5$ for amplifying. The amplified signal is taken from the collector electrode of the transistor, and then conveyed through coupling condenser $C_7$ to the base electrode of transistor $Tr_6$ in the adder 14.

The sync pulses separated and processed in the aforementioned way are fed from the separator 13 and led through conductor 100 and coupling condenser $C_8$ to the base electrode of transistor $Tr_7$ acting as a phase converter, thence to the slider of rheostat $R_6$. At this rheostat, both the television signal and the separated and processed sync pulses are overlapped with each other. By adjusting this rheostat, the peak level of the sync pulses are selected to a higher value than the "white" level of the corresponding video signal.

Figure 8:
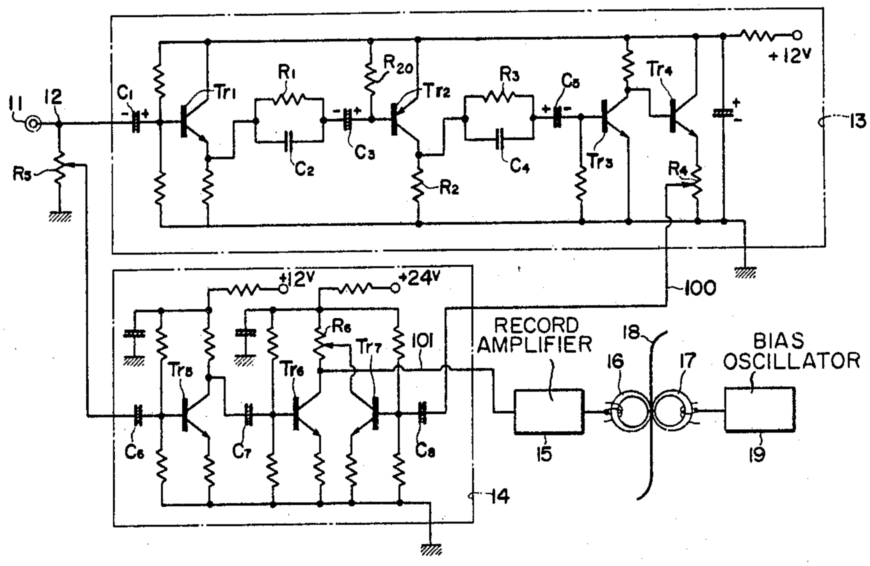
FIG. 8 is a circuit diagram of a preferred embodiment of the invention, illustrative of the recording part only of the recording and reproducing arrangement adapted for carrying out the improved technique.

The thus obtained composite signal, the waveform of which is shown schematically and only by way of example in FIG. 9 at (*c*), is taken from the collector electrode of transistor $Tr_6$, is amplified in record amplifier 15 of conventional design and thus shown schematically by a block in FIG. 8, and thence conveyed through a coupling condeneser, not shown, to record magnetic head 16 which may be of any conventional design.

The record head 16 is stationarily arranged on a video tape recorder, although not shown, which head is arranged to cooperate with an elongated and recordable magnetic medium such as magnetic tape 18 only schematically shown and kept to run at a comparatively low speed such as 60 inches per second. The nature and dimensions of the tape 18 may be those set forth hereinbefore. 17 denotes a biasing magnetic head which is arranged in a substantially and physically opposing relation to the record head 16 as shown and fed with H.F. bias signal from bias oscillator 19 of conventional design as is commonly known to those skilled in the art.

Figure 10:
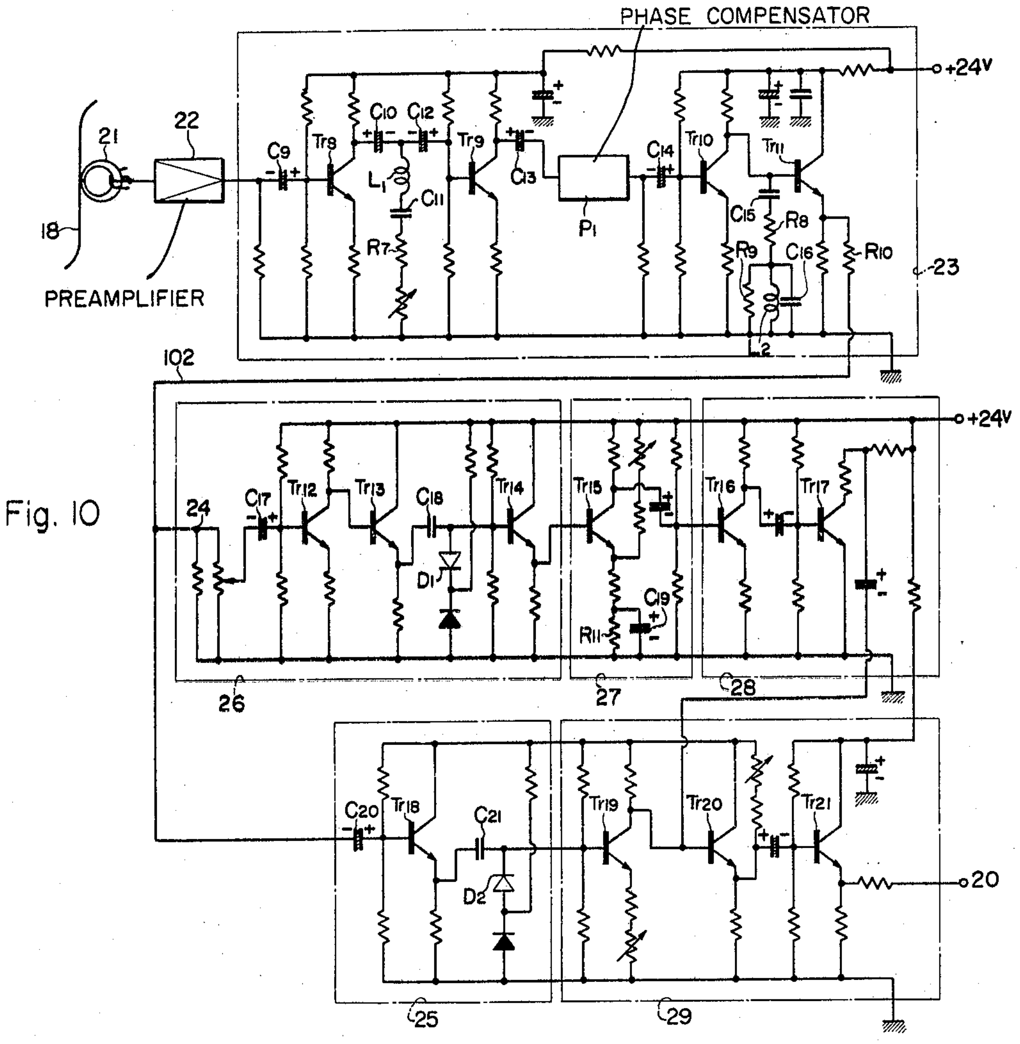
FIG. 10 is a circuit diagram of a preferred embodiment of the reproducing part only of the recording and reproducing arrangement adapted for carrying out the improved technique.

Next, referring to FIG. 10, numeral 21 denotes a reproducing magnetic head of conventional stationary design and arranged to cooperate with said magnetic tape 18 already recorded in the aforementioned manner.

The signal picked up by the reproducing head 21 from the recorded tape 18 is conveyed to a preamplifier 22, thence to equalizer 23. Or more specifically, the amplified signal corresponding to the wave form shown in FIG. 11 at (*a*), is led through a coupling condenser $C_9$ to the base electrode of transistor $Tr_8$. The thus amplified signal is led from the collector electrode of the transistor through a coupling condenser $C_{10}$ to a series resonance circuit comprising coil $L_1$, condenser $C_{11}$ and resistor $R_7$, so as to compensate the amplitude distorsion caused by possible resonance of the reproducing head 1.

Figures 11A, 11B, 11C, 11D:
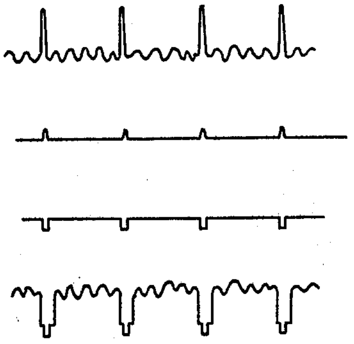
FIGURES 11(*a*), 11(*c*) and 11(*d*) are diagrams illustrative of wave forms of several signals as appearing at preferred points in the arrangement shown in FIG. 10.

The thus compensated signal is conveyed through a coupling condenser $C_{12}$ to the base electrode of transistor $Tr_9$ acting as an amplifier. The amplified signal is taken from the collector electrode of the last mentioned transistor, thence conveyed through a coupling condenser $C_{13}$ to phase compensator $P_1$ of conventional design and thus shown only schematically by a block. The thus processed signal compensated for possible amplitude distorsion as well as phase distorsion is led through coupling condenser $C_{14}$ to the base electrode of transistor $Tr_{10}$ acting as an amplifier. The amplified signal is led from the collector electrode of the transistor to a peaking circuit comprising condensers $C_{15}$ and $C_{16}$ resistors $R_8$ and $R_9$ and peaking coil $L_2$ for the compensation of its characteristics by a predetermined amount such as, for example, 6 db/oct. through the way of integration. The thus processed signal is conveyed to the base electrode of transistor $Tr_{11}$ and taken out from the emitter electrode thereof, the signal form being schematically shown, only by way of example in FIG. 9 at (*c*). This signal is led through resistor $R_{10}$ and conductor 102 to junction point 24, thence to D.C. restoration circuits 25 and 26, respectively. The signal fed to the latter circuit 26 is conveyed through a coupling condenser $C_{17}$ to transistor $Tr_{12}$, thence to transistor $Tr_{13}$ so as to be amplified. The amplified signal is further led through diode $D_1$ so as to be subjected to D.C. restoration and to align the peaks of the contained and modified sync pulses practically on a straight line, thence to the base electrode of transistor $Tr_{14}$. The output signal taken from the emitter electrode of the transistor is supplied to the base electrode of transistor $Tr_{15}$ of slicer or sync pulse separator circuit 27 comprising condenser $C_{19}$ and resistor $R_{11}$, so as to slice the modified sync pulses at a slightly higher level than that corresponding to the "white" level, for providing a series of stabilized signal pulses as schematically illustrated in FIG. 11 at (*b*). This slicing process is carried out for cutting out the peak portions of the positively polarized sync pulses which are possibly subjected to distortion by noises and thus highly unstable, thereby providing a reliably timed pulse series shaped from the stabilized root portions of the originally included and processed sync pulses. The thus separated periodic pulses are then fed to shaper circuit 28 comprising transistors $Tr_{16}$ and $Tr_{17}$, so as to provide precisely timed, negative rectangular pulses as schematically represented in FIG. 11 at (*c*).

On the other hand, the signal conveyed from junction point 24 to D.C. restoration circuit 25 is passed through coupling condenser $C_{20}$, transistor $Tr_{18}$, coupling condenser $C_{21}$ and diode $D_2$. The thus D.C. restored television signal including positively polarized sync pulses is amplified in a transistor $Tr_{19}$ of adder 9. The output signal from the collector of the last mentioned transistor is overlapsed with the rectangular pulse series as at (*c*), FIG. 11, for providing a composite output signal including negatively polarized sync pulses as employed normally in the conventional television engineering field, and shown schematically and by way of example in FIG. 11 at (*d*). The output signal is fed to the base electrode of transistor $Tr_{20}$ acting as an amplifier, and the amplified output is fed from the emitter electrode of the transistor to a buffer transistor $Tr_{21}$, thence to output terminal 20 which is electrically connected to a video amplifier of conventional television receiving set, although not shown, for displaying the thus reproduced and restored television signal in the form of visual images.

Although in the foregoing, only a reproducing magnetic head as at 21 was employed, two magnetic heads having specific wider and narrower slit gaps may under occasions be employed for picking up from the recorded tape 18 specified higher and lower frequency range of signal informations contained in the recorded television signal, for the purpose of avoiding possible deficiency of lower frequency signal components originally contained and recorded television signal. The two kinds of picked up signal components must be synthesized electrically or electronically at a later stage of the reproducing system, although not shown. If the aforementioned kind of deficiency of reproduced lower frequency signal components should take place, the reproduced signal will take the form of wavy distribution as a whole when seen along the axial length of the tape. When occasion may require, the record head as at 16 may also be split into two head elements destined for specific higher and lower frequency signal components contained in the television signal to be recorded and reproduced.

When the aforementioned modified television signal processed so as to have positively polarized sync pulses is recorded and reproduced magnetically, especially with use of stationary heads in the aforementioned way, clamp noises so-called may substantially be suppressed, because the modified and reproduced television signal having positively polarized sync pulses are clamped and only thereafter the generated and shaped negative rectangular pulse series is added thereto. This mode of processing the television signal will provide the possibility for clamping the contained sync pulses at their full peaks which obviate the possible generation of clamp noises. If this kind of noises should be introduced and contained in the magnetically reproduced television signal, white-and-black noise strips may develop on the screen of the television set.

Figure 12A:
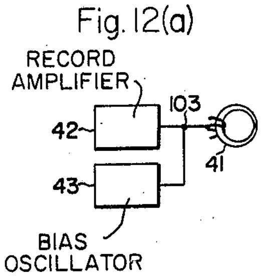
FIGURES 12(*a*) and 12(*b*) show two modified arrangements from the corresponding part of the arrangement shown in FIG. 8.
Figure 12B:
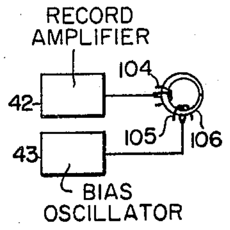

In place of the cross-field technique employed in the record head arrangement shown in FIG. 8, a sole record head 41 or 42 may be employed as shown in FIG. 12 at (*a*) or (*b*), respectively. In the first modification shown at (*a*), FIG. 12, the output from record amplifier 42 of similar design to that denoted by 15, FIG. 8, is electrically combined with the output from bias oscillator 43 which is of similar design to that shown at 19 in FIG. 8. In the second embodiment, the outputs from record amplifier 42 and bias oscillator 43 are fed to respective coils 104 and 105 on the common magnetic core of record head 106, so as to magnetically combine the both applied signals, as in a more conventional way. It will be clear that with use of any one of these two modifications, equal results may be obtained.

It will be further clear from the foregoing that according to the present invention, clamp noises can be effectively suppressed with superior signal noise ratio.

In view of the above, it will be seen that several objects of the invention are achieved and other advantageous results attained.

As various changes could be made in the above system without departing from the scope of the invention, it is intended that all matter contained in the above description or shown in the accompanying drawings shall be interpreted as illustrative and not in a limiting sense.

We claim:

1. A method for direct magnetic recording and reproducing of television signals comprising the steps of processing the television signals prior to recording in such a way that the negatively polarized synchronizing pulses contained in said signals are modified to be positively polarized and have peak values which are substantially constant and selected at a signal level higher than the "white" level of the video signals contained in the television signals, and magnetically recording the processed television signals.

2. The method as set forth in claim 1, wherein said peak levels are preferably in the order of +140 to +150% relative to a "white" level of +100%.

3. The method as set forth in claim 1, wherein said step of processing includes the steps of separating the synchronizing pulses from said television signals, amplifying the separated synchronizing pulses, inverting the polarity of the separated and amplified pulses, and combining the inverted pulses with said television signals in phase with the contained negatively polarized synchronizing pulses.

4. The method as set forth in claim 3 further including the step of passing the separated synchronizing pulses through a peak level adjusting stage.

5. The method as set forth in claim 1, further including the steps of magnetically reproducing the recorded processed television signals, slicing the reproducted signals at a slightly higher level than the corresponding "white" level, separating therefrom a series of pulses, shaping said pulse series into corresponding rectangular pulses, D.C. restoring the reproduced signals, and combining the D.C. restored signals with said rectangular pulse series to reproduce composite television signals containing therein negatively polarized synchronizing pulses.

6. A system for direct magnetic recording and reproducing of television signals comprising means for separating the synchronizing pulses from said television signals, means for inverting the polarity of the separated pulses, means for combining the inverted pulses with the television signals to produce modified television signals, and means for magnetically recording said modified television signals.

7. The system as set forth in claim 6, further comprising means for magnetically reproducing the recorded modified television signals, means for separating from the reproduced signals a series of pulses corresponding to the synchronizing pulses, means for shaping said pulse series into corresponding rectangular pulses, means for D.C.

restoring the reproduced television signals, and means for combining the D.C. restored signals with said rectangular pulse series to reproduce composite television signals containing therein negatively polarized synchronizing pulses.

References Cited

UNITED STATES PATENTS 2,734,941 2/1956 Zenel.

FOREIGN PATENTS 1,041,633 9/1966 Great Britain.

RICHARD MURRAY, Primary Examiner

DONALD E. STOUT, Assistant Examiner

U.S. Cl. X.R.

178—69.5; 179—100.2